(12) United States Patent
Ikenoue

(10) Patent No.: US 9,767,568 B2
(45) Date of Patent: Sep. 19, 2017

(54) IMAGE PROCESSOR, IMAGE PROCESSING METHOD, AND COMPUTER PROGRAM

(71) Applicant: Sony Computer Entertainment Inc., Tokyo (JP)

(72) Inventor: Shoichi Ikenoue, Chiba (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/827,697

(22) Filed: Aug. 17, 2015

(65) Prior Publication Data

US 2016/0110610 A1 Apr. 21, 2016

(30) Foreign Application Priority Data

Oct. 15, 2014 (JP) ................................. 2014-211104

(51) Int. Cl.
*G06K 9/00* (2006.01)
*G06T 7/00* (2017.01)
(Continued)

(52) U.S. Cl.
CPC ........ *G06T 7/0083* (2013.01); *G06K 9/00362* (2013.01); *G06T 7/12* (2017.01); *G06T 7/248* (2017.01); *G06T 2207/10028* (2013.01)

(58) Field of Classification Search
CPC . G06T 2207/10028; G06T 2207/10024; G06T 7/0051; G06T 7/0083; G06T 7/12; G06T 7/248; G06K 9/00362
See application file for complete search history.

(56) References Cited

U.S. PATENT DOCUMENTS

2008/0212836 A1* 9/2008 Fujimura ........... G06K 9/00369
382/103
2011/0080336 A1* 4/2011 Leyvand ............... G06K 9/469
345/156

(Continued)

OTHER PUBLICATIONS

Michael Isard, et. al., "Contour tracking by stochastic propagation of conditional density", Department of Engineering Science, University of Oxford, Oxford, UK, in Proc. European Conf. Computer Version, vol. 1, 1996, pp. 343-356, Cambridge, UK.

(Continued)

*Primary Examiner* — Jonathan S Lee
(74) *Attorney, Agent, or Firm* — Katten Muchin Rosenman LLP

(57) ABSTRACT

Disclosed herein is an image processor including: a depth image acquisition portion adapted to acquire a depth image for an image frame making up the movie, the depth image representing, as a pixel value on an image plane, a subject distance from an imaging device; an edge extraction portion adapted to generate an edge image for the image frame and identify a picture area of a tracked target in the depth image on the basis of an outline of the tracked target represented by tracking results for the image frame at a previous time so as to extract an edge in an area limited on the basis of the picture area; and a tracking section adapted to compare the extracted edge against an outline candidate for the tracked target to find a likelihood so as to estimate the outline of the tracked target and output the outline as tracking results.

4 Claims, 10 Drawing Sheets

(51) Int. Cl.
    *G06T 7/12*           (2017.01)
    *G06T 7/246*         (2017.01)

(56) References Cited

U.S. PATENT DOCUMENTS

| | | | | |
|---|---|---|---|---|
| 2013/0190086 | A1* | 7/2013 | Maison | G06K 9/00369 463/31 |
| 2013/0201104 | A1* | 8/2013 | Ptucha | G06F 3/017 345/158 |
| 2014/0107842 | A1* | 4/2014 | Yoon | G05D 1/0248 700/259 |
| 2014/0139633 | A1* | 5/2014 | Wang | G06K 9/00201 348/46 |
| 2014/0307955 | A1* | 10/2014 | Liu | G06K 9/4642 382/154 |
| 2015/0055828 | A1* | 2/2015 | Zhao | G01S 17/50 382/103 |

OTHER PUBLICATIONS

Michael Isard, et. al., "Icondensation: Unifying low-level and high-level tracking in a stochastic framework", Department of Engineering Science, University of Oxford, Oxford, UK, Proc. 5th European Conf., Computer Vision, 1998.

* cited by examiner

FIG.6
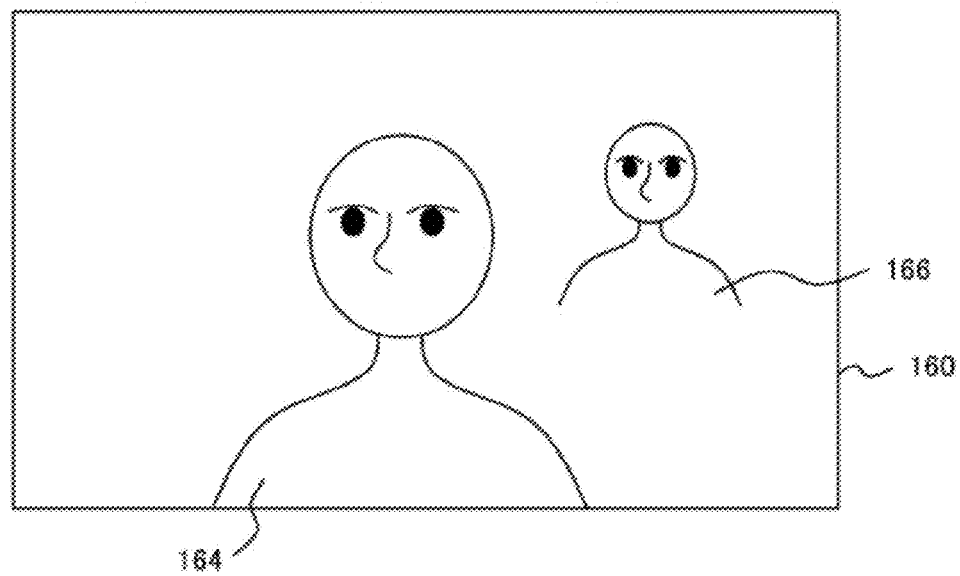
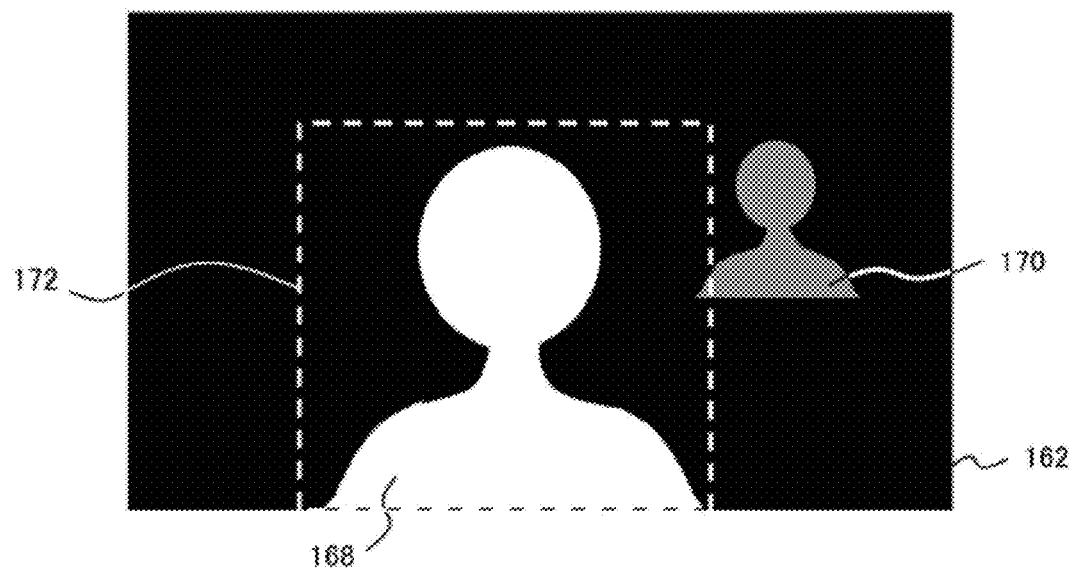

IMAGE PROCESSOR, IMAGE PROCESSING METHOD, AND COMPUTER PROGRAM

BACKGROUND

The present disclosure relates to an image processing technology and, more particularly, to an image processor for tracking a target by analyzing a movie, and an image processing method carried out therein.

Visual tracking holds promise for application to a variety of sectors including computer vision and, more particularly, visual monitoring in the security field, analysis, classification, and editing of documentary films in the audiovisual field, or man-machine and human-to-human interfaces, i.e., television (TV) conference and TV phone. Therefore, many studies have been made to ensure improved tracking accuracy and processing efficiency. Above all, a number of studies have been conducted to apply a particle filter to visual tracking. Particle filter has attracted attention as a chronological analysis technique for signals added with non-Gaussian noise. It is difficult to deal with non-Gaussian noise with a Kalman filter. In particular, the Condensation (Conditional Density Propagation) algorithm is famous (refer, for example, to Contour tracking by stochastic propagation of conditional density, Michael Isard and Andrew Blake, Proc. European Conf. on Computer Vision, vol. 1, pp. 343-356, Cambridge UK (1996) (hereinafter referred to as Non-Patent Document 1) and ICondensation: Unifying low-level and high-level tracking in a stochastic framework, Michael Isard and Andrew Blake, Proc. 5th European Conf. Computer Vision, 1998 (hereinafter referred to as Non-Patent Document 2)).

Particle filter is an approximation technique which represents a target probability distribution by introducing a finite number of particles as candidates for tracking and then performs a time-series estimation and prediction. When a particle filter is used for visual tracking, the motion of a parameterized target is treated as a single particle so that a presence distribution probability is estimated successively in a parametric space of interest by moving particles using a kinetic model and calculating the likelihood of the movement result through observation.

SUMMARY

In conventional tracking using a particle filter, how to build a kinetic model is a large issue. A possible solution would be to set a kinetic model after having anticipated a target motion to a certain extent in accordance with the category of an image. However, deviation of the actual motion from the anticipated motion leads to poor tracking accuracy. Possible measures to maintain the accuracy would be to increase particles and diversify the kinetic model. However, these measures tend to result in increased processing load, making real-time tracking difficult.

Further, a candidate for tracking represented by each particle is compared against a real shot image when the likelihood of movement results is calculated. At this time, in the event of change in characteristics of the shot image due to the shooting environment including the number of objects present in the camera's field of view, their colors and illumination, the likelihood calculation may be affected, which may, by extension, change the tracking accuracy.

In light of the foregoing, it is desirable to provide a visual tracking technology which is unlikely to be affected by the changes in tracked target's kinetic characteristics and shooting environment for high accuracy and efficiency.

One mode of the present disclosure relates to an image processor. The image processor tracks a picture of a target in a movie and includes a depth image acquisition portion, an edge extraction portion, and a tracking section. The depth image acquisition portion acquires a depth image for an image frame making up the movie. The depth image represents, as a pixel value on an image plane, a subject distance from an imaging device. The edge extraction portion generates an edge image for the image frame and identifies a picture area of a tracked target in the depth image on a basis of an outline of the tracked target represented by tracking results for the image frame at a previous time so as to extract an edge in an area limited on a basis of the picture area from the edge image. The tracking section compares the extracted edge against an outline candidate for the tracked target to find a likelihood, thus estimating the outline of the tracked target and outputting the outline as tracking results.

Another mode of the present disclosure relates to an image processing method. The image processing method is used by an image processor to track a picture of a target in a movie. The image processing method includes acquiring an image frame making up the movie from an imaging device and storing the image frame in a memory. The image processing method further includes acquiring a depth image for the image frame making up the movie, the depth image representing, as a pixel value on an image plane, a subject distance from the imaging device. The image processing method still further includes reading the image frame from the memory, generating an edge image for the image frame, and identifying a picture area of a tracked target in the depth image on a basis of an outline of the tracked target represented by tracking results for the image frame at a previous time so as to extract an edge in an area limited on a basis of the picture area from the edge image. The image processing method still further includes comparing the extracted edges against an outline candidate for the tracked target to find a likelihood, thus estimating the outline of the tracked target and storing the outline as tracking results in the memory.

Further another mode of the present disclosure relates to a computer program causing a computer for tracking a picture of a target in a movie to achieve. The computer program includes: acquiring a depth image for an image frame making up the movie, the depth image representing, as a pixel value on an image plane, a subject distance from an imaging device; generating an edge image for the image frame and identifying a picture area of a tracked target in the depth image on a basis of an outline of the tracked target represented by tracking results for the image frame at a previous time so as to extract an edge in an area limited on a basis of the picture area from the edge image; and comparing the extracted edge against an outline candidate for the tracked target to find a likelihood so as to estimate the outline of the tracked target and output the outline as tracking results.

It should be noted that arbitrary combinations of the above components and arbitrary conversions of expressions of the present disclosure between method, device, system, recording medium, computer program and so on are also effective as modes of the present disclosure.

The present disclosure permits stable visual tracking irrespective of the actual conditions.

BRIEF DESCRIPTION OF THE DRAWINGS

FIG. 6 is a diagram for describing the principle of extracting an edge for a tracked target using a depth image in the present embodiment;

DETAILED DESCRIPTION OF THE PREFERRED EMBODIMENT

Figure 1:
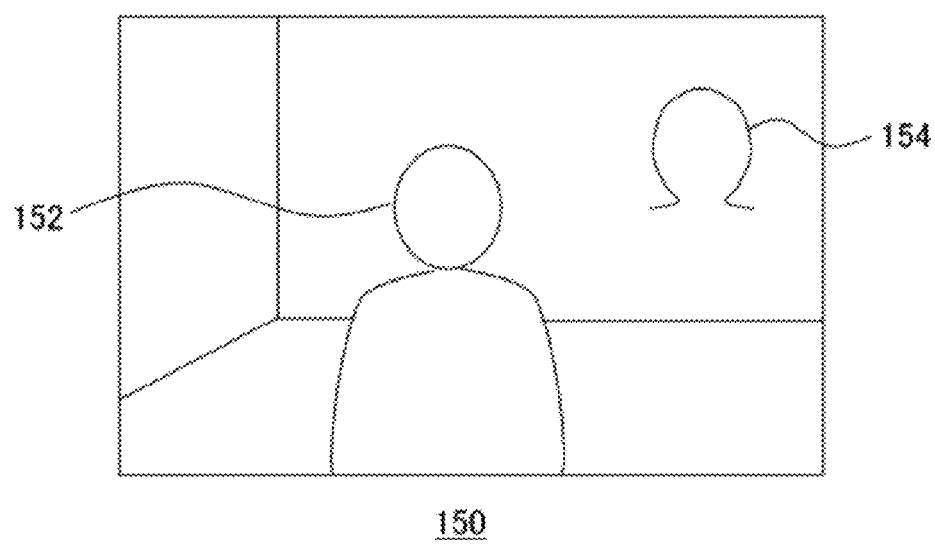
FIG. 1 is a diagram for describing a visual tracking technique when a person is tracked target.

A general description will be given first of visual tracking using a particle filter to clarify the features and effect of the present embodiment. FIG. 1 is a diagram for describing a visual tracking technique when a person is tracked target. A human image 150 is one of image frames making up a movie image stream generated, for example, using a captured movie or by computer graphics. The human image 150 shows a person 152 who is tracked target.

In order to track the motion of the person 152, an ohm-shaped curve 154 which is closely analogous to the shape of the outline of the head of the person 152 will be described with a known expression. On the other hand, an edge image is acquired in advance by subjecting the human image 150 including the person 152 to edge extraction. The parameters that define the curve 154 are varied to vary the shape and position thereof, searching for edges nearby and identifying a parameter value that is most likely to suits the outline of the head of the person 152. The tracking of the person 152 progresses with the above processes are repeated. Here, the term "edge" refers to a point having a sudden change in image luminance or color.

A probability distribution prediction technology based on particle filter is introduced to perform matching between the various curves 154 and the outline of the head of the person 152. That is, the number of the curves 154 sampled is changed in accordance with the probability distribution of targets in a parameter space in a previous frame, thus narrowing down candidates for tracking. This allows for search, with emphasis, of those areas with high probability of presence of candidates, thus ensuring highly accurate and efficient matching.

A technique for applying a particle filter to tracking with focus on target outline is described in detail, for example, in Non-Patent Document 2. Here, a description will be given with focus on the points relating to the present embodiment.

First, the ohm-shaped curve 154 is described by a B spline curve. The B spline curve is defined by a sequence of n control points (Q0, ... , Qn) and a sequence of n knots (s0, ... , sn). Then, these parameters are specified in advance to achieve a basic curve shape, and in this case, an ohm-shaped curve. The curve obtained by the settings at this time will be hereinafter referred to as a template Qo. It should be noted that although the template Qo is ohm-shaped when the person 152 of the human image 150 in FIG. 1 is tracked, the shape thereof is changed in accordance with the tracked target. That is, if a ball is tracked, the template Qo is circular, and if a palm is tracked, the template Qo is in the shape of a hand.

Next, a shape space vector x is prepared as a conversion parameter to change the shape of the template. The shape space vector x includes the following six parameters.

$$x = (\text{shift}_x, \text{shift}_y, \text{extend}_x \cos\theta - 1, \text{extend}_y \cos\theta - 1, -\text{extend}_x \sin\theta, \text{extend}_y \sin\theta)^T \quad \text{(Formula 1)}$$

Here, ($\text{shift}_x$, $\text{shift}_y$) are the translations in the (x, y) directions, ($\text{extend}_x$, $\text{extend}_y$) are the magnification factors, and θ is the rotational angle. Then, the curve after deformation, i.e., a candidate curve Q, can be described as follows by using an action matrix W that causes the shape space vector x to act on the template Qo.

$$Q = W_x + Q_0, \quad \text{(Formula 2)}$$

$$W = \begin{pmatrix} 1 & 0 & Q_0^x & 0 & 0 & Q_0^y \\ 0 & 1 & 0 & Q_0^y & Q_0^x & 0 \end{pmatrix}$$

Using Formula 2, it is possible to translate, extend, and rotate the template by changing, as appropriate, the six parameters making up the shape space vector x. Depending on the combination, the shape and position of the candidate curve Q can be changed in various ways.

Then, an edge of the person 152 near each knot is searched for a plurality of candidate curves represented by changing the parameters of template $Q_0$ such as spacing between the control point of the sequence and the knots of the sequence and the six parameters making up the shape space vector x. Then, the likelihood of each candidate curve is found, for example, from the distances to the edges, thus estimating the probability density distribution in the six-dimensional space formed by the six parameters making up the shape space vector x.

Figure 2:
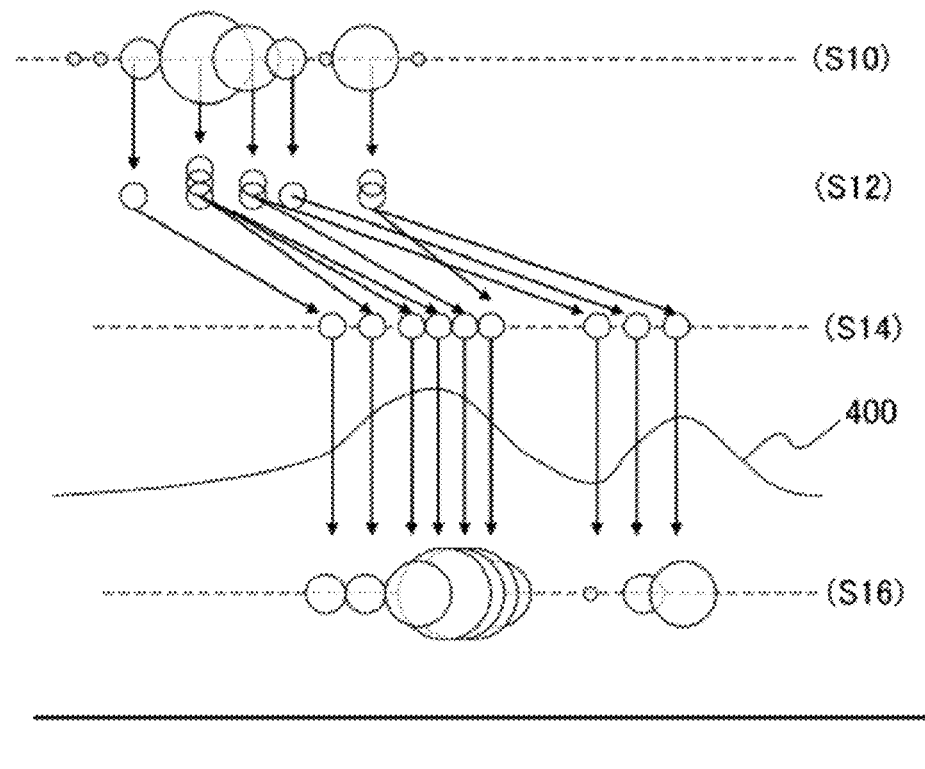
FIG. 2 is a diagram for describing a probability density distribution estimation technique using a particle filter.

FIG. 2 is a diagram for describing a probability density distribution estimation technique using a particle filter. Although, in FIG. 2, the change in a parameter x1, one of the six parameters making up the shape space vector x, is shown along the horizontal axis to facilitate the understanding, a similar process is actually performed in the six-dimensional space. Here, we assume that the image frame whose probability density distribution is to be estimated is an image frame at time t.

First, particles at time t are generated (S12) using the probability density distribution on the parameter x1 axis estimated in the image frame at time t−1, i.e., the image frame previous to the image frame at time t (S10). If it is found that there are particles as a result of filtering performed before then, the breakup and extinction thereof are determined. The probability density distribution represented in S10 has been found discretely in association with the coordinates in the parameter space, showing that the larger the circle, the higher the probability density.

Particles are each a materialization of a parameter x1 value and a sampling density. For example, the parameter x1 area has a high probability density at time t−1. Therefore, the particle density of this area is increased, thus allowing the area to be predominantly sampled. For the areas having low probability densities, on the other hand, the number of particles is small, thus ensuring that these areas are not sampled much. This allows many candidate curves to occur near the edges of the person 152, thus ensuring efficient matching.

Next, the particles are moved in the parameter space by applying a kinetic model of some kind (S14). Among kinetic models used in related art are Gaussian kinetic model and self-regression predictive kinetic model. The former states that the probability density at time t is Gaussian-distributed around each of the probability densities at time t−1. The latter is a technique that hypothesizes a second or higher order self-regression predictive model. For example, this technique assumes that the person 152 is moving at a constant speed from the changes in parameters in the past.

In the present embodiment which will be described later, on the other hand, the image frames at times t−1 and t are compared to separately acquire information relating to the changes in position of the picture to be tracked, thus determining the particle movement. It should be noted that the particles are moved in the positive direction of the parameter x1 as an example in the example shown in FIG. 2.

Next, the edges of the person 152 near the candidate curve determined by each particle are searched for using the edge image at time t, thus finding the likelihood of each candidate curve and estimating the probability density distribution at time t (S16). As described earlier, the probability density distribution at this time is a discrete representation of a true probability density distribution 400 as illustrated in S16. From here onwards, the probability density distribution at each time is represented in the parameter space by repeating the above processes.

For example, if the probability density distribution is monophasic, that is, if there is only one tracked target, a curve having an outline closest to that of the tracked target is acquired by weighting each parameter value with the acquired probability density and using the sum thereof as a final parameter. The probability density distribution $p(x_t^i)$ at time t estimated in S16 is calculated as follows.

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \quad \text{(Formula 3)}$$

Here, i is the number uniquely given to the particle, $p(x_t^i|x_t^i, u_{t-1})$ is the kinetic model applied, and $p(y_t|x_t^i)$ is the likelihood.

Figure 3:
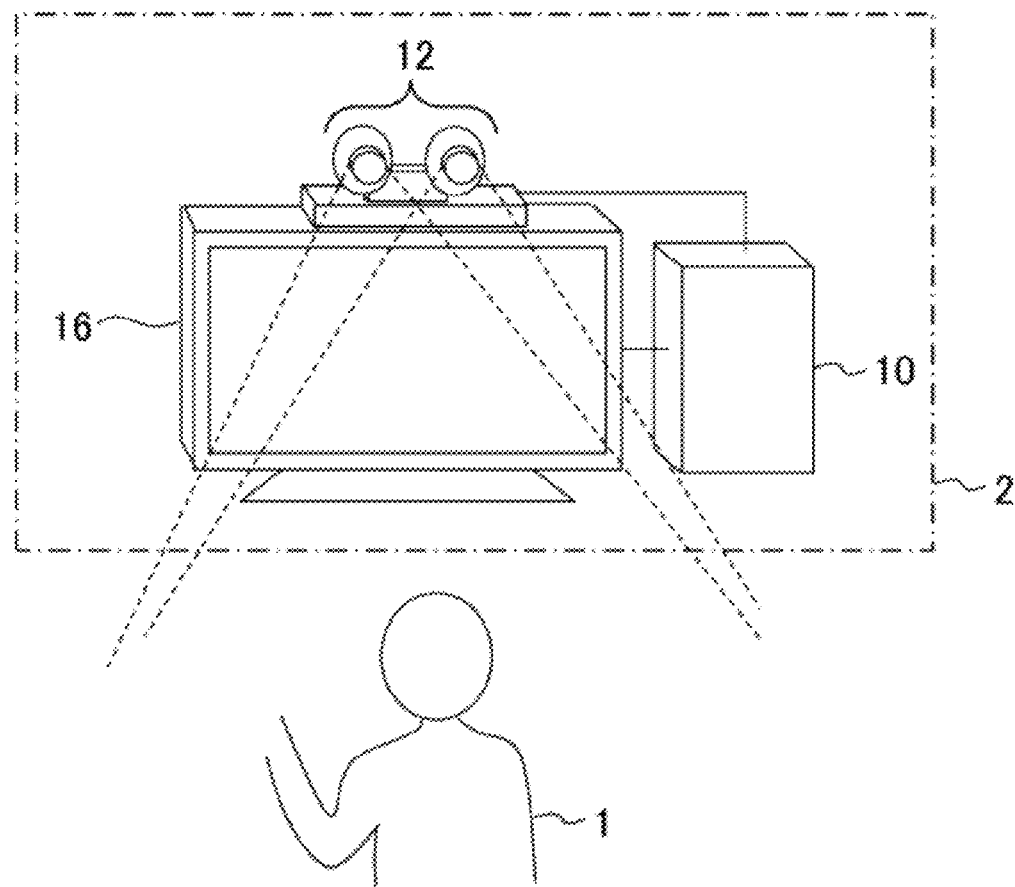
FIG. 3 is a diagram illustrating a configuration example of a visual tracking system in the present embodiment.

FIG. 3 illustrates a configuration example of a visual tracking system in the present embodiment. A visual tracking system 2 includes an imaging device 12, a tracking device 10, and a display device 16. The imaging device 12 captures an image of a tracked target 1. The tracking device 10 performs tracking. The display device 16 outputs image data and tracking result data captured by the imaging device 12. The tracked target 1 may vary such as person, object, or part thereof depending on the purpose of use of the visual tracking system 2. In the description given below, however, we assume that the tracked target 1 is a person as in the example described above.

The connection between the tracking device 10 and the imaging device 12 or the display device 16 may be made in a wired or wireless manner and via a variety of networks. Alternatively, any two of the tracking device 10, the imaging device 12, and the display device 16 or all thereof may be combined integrally. Further, depending on the environment in which these devices are used, the imaging device 12 and the display device 16 may not simultaneously connect to the tracking device 10.

The imaging device 12 acquires an image including the tracked target 1 or location image data, irrespective of the presence of the tracked target 1, at a given frame rate. The imaging device 12 is a stereo camera that includes two cameras adapted to shoot the same space from left and right positions at a known distance from each other, with each camera including a charge coupled device (CCD), complementary metal oxide semiconductor (CMOS) or other imaging element. Acquired image data is successively supplied to the tracking device 10 for tracking of the tracked target 1. Information relating to the distance of the tracked target 1 from the imaging device 12 is acquired using stereo images shot from the left and right viewpoints at this time and utilized it.

It should be noted that the imaging device 12 may include a monocular video camera and a sensor capable of acquiring the distance of the tracked target 1 from the imaging device 12 rather than a stereo camera. Alternatively, a device adapted to irradiate a target with a reference beam such as infrared beam and detect a reflected beam may be used as a sensor capable of acquiring the distance of the tracked target 1. Still alternatively, the imaging device 12 may output image data with a plurality of resolutions by reducing acquired image frames to given resolutions.

Tracking results are output as output data to the display device 16 under control of the tracking device 10. The tracking device 10 may also serve as a computer adapted to handle other functions and offer a variety of functions such as games by using data obtained as a result of tracking, i.e., position and shape information of the tracked target 1.

Figure 4:
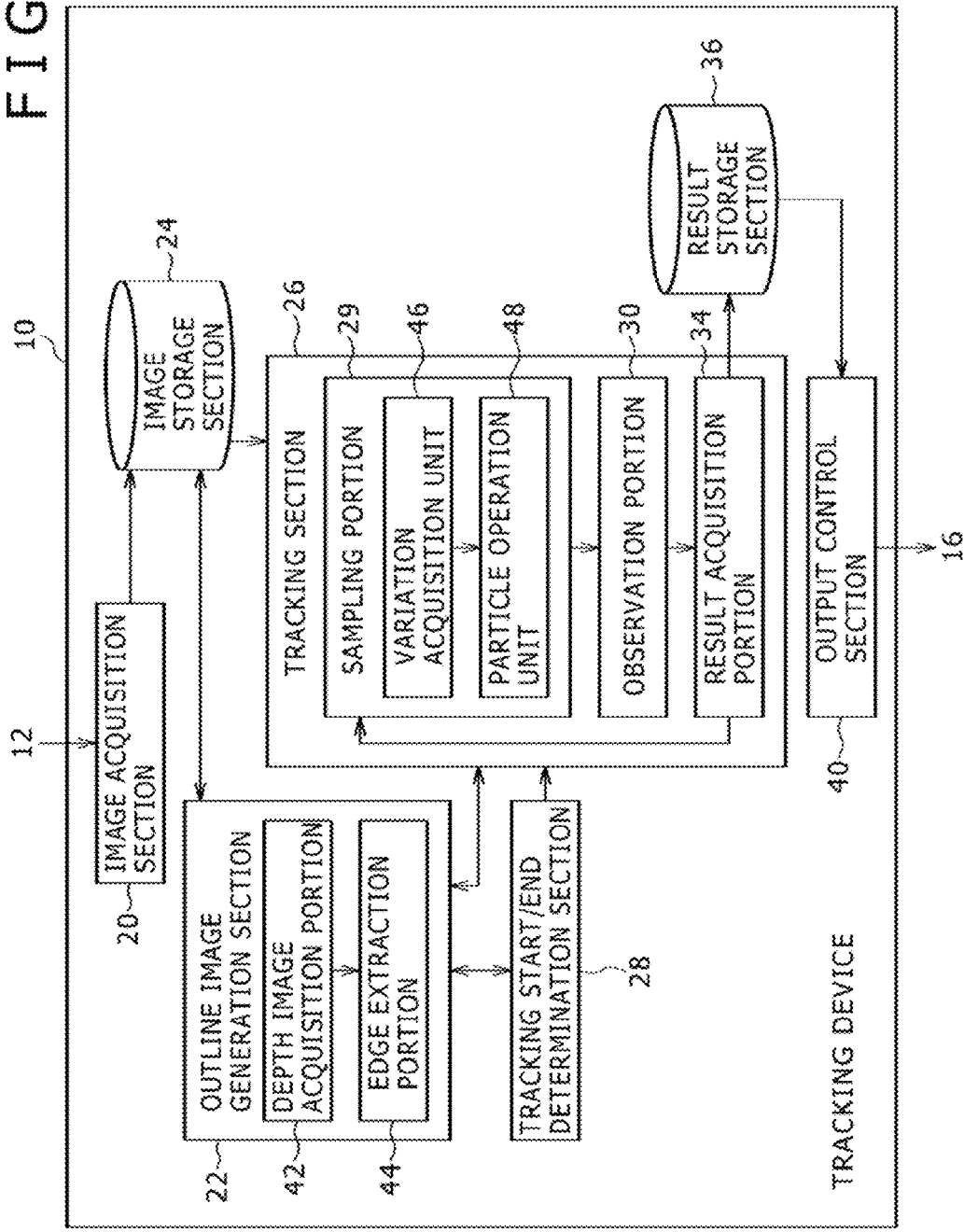
FIG. 4 is a diagram illustrating in detail a configuration of a tracking device in the present embodiment.

FIG. 4 illustrates in detail a configuration of the tracking device 10 in the present embodiment. The tracking device 10 includes an image acquisition section 20, an image storage section 24, an outline image generation section 22, a tracking start/end determination section 28, a tracking section 26, a result storage section 36, and an output control section 40. The image acquisition section 20 acquires shot image data supplied from the imaging device 12. The image storage section 24 stores shot image data, depth image data, and outline image data. The outline image generation section 22 generates an outline image from a shot image. The tracking start/end determination section 28 determines the start and end of tracking. The tracking section 26 performs tracking using a particle filter. The result storage section 36 stores final tracking result data. The output control section 40 controls the output of tracking results to the display device 16.

In FIG. 4, each of the components shown as a functional block adapted to handle a variety of processing tasks can be built, in terms of hardware, with a central processing unit (CPU), memories, and other large scale integrations (LSIs) and, implemented, in terms of software, by a program adapted to handle image processing. Therefore, it is understood by those skilled in the art that these functional blocks can be implemented in various ways by hardware alone, software alone, or a combination thereof and that the present disclosure is not limited to any one of them.

The image acquisition section 20 establishes communication with the imaging device 12 by a common technology, immediately acquiring data on the basis of shot image frames. Data acquired here may include not only stereo image data but also data representing at least one of the stereo images with a plurality of resolutions. Further, data may be shot image data and depth image data from a single viewpoint. Acquired data is successively stored in the image storage section 24.

The outline image generation section 22 extracts the tracked target outline from each of the shot image frames, thus generating an outline image. The outline image is stored in the image storage section 24 and will be used later for likelihood observation of candidate curves by an observation portion 30 of the tracking section 26. An "outline" is part of an "edge" in an edge image. In related art, therefore, an "edge image" has been used in an as-is manner for likelihood observation. In common edge extraction, however, many edges are extracted including not only the tracked target outline but also other edges. It is probable that likelihood observation may not be accurate due to matching with edges other than the outline. On the other hand, if the number of edges is reduced by specifying a high threshold for extracting edges, the outline is interrupted, possibly still making likelihood observation inaccurate.

For this reason, the outline image generation section 22 in the present embodiment extracts only reliable edges of those extracted in that manner as a tracked target outline, thus ensuring high accuracy in likelihood observation. An image made up of edges extracted in this manner will be hereinafter referred to as an "outline image" for distinction from a common "edge image." As specific components, the outline image generation section 22 includes a depth image acquisition portion 42 and an edge extraction portion 44. The depth image acquisition portion 42 acquires a depth image of each of the image frame, supplying the depth image to the edge extraction portion 44. Here, a depth image refers to an image that represents the distances of objects in the field of view from the imaging device 12 that are mapped into two-dimensional coordinates of the image plane.

In a mode for acquiring stereo image data from the imaging device 12, the depth image acquisition portion 42 generates a depth image by a common technique such as the stereo image method using the stereo images stored in the image storage section 24. The stereo image method is a technique designed to find parallax from the positions of the pictures of the same subject in the stereo images so as to derive the distance in the depth direction on the basis of the principle of triangulation. In this case, the depth image acquisition portion 42 also stores the generated depth image data in the image storage section 24 in preparation for subsequent tracking. In a mode for detecting the distance of a subject from the imaging device 12, on the other hand, the depth image acquisition portion 42 reads, from the image storage section 24, depth image data generated and transmitted by the imaging device 12 through a technology such as time of flight (TOF).

The edge extraction portion 44 identifies the picture area of the tracked target on the basis of the depth image acquired by the depth image acquisition portion 42 and the tracking results of the previous image frame derived by the tracking section 26. Then, the edge extraction portion 44 extracts edges for the picture area of the tracked target of those edges included in the edge image generated from the image frame. As a result, an outline image is generated which is made up of edges that have probably occurred because of the tracked target. If there are a plurality of tracked targets, an outline image is generated for each tracked target.

The tracking start/end determination section 28 evaluates, for example, the shape of the outline acquired by the outline image generation section 22, determining whether to start or end tracking under a given condition. It should be noted that "end" here may also include temporary stopping of tracking due, for example, to occlusion. Tracking begins, for example, when a tracked target emerges in the field of view of the imaging device 12 or appears from behind an object and ends when the tracked target moves outside the field of view of the imaging device 12 or disappears behind an object. When determining that tracking has started or ended, the tracking start/end determination section 28 notifies the tracking section 26 to that effect.

The tracking section 26 includes a sampling portion 29, an observation portion 30, and a result acquisition portion 34. The sampling portion 29 generates or extinguishes particles on the basis of the probability density distribution estimated for the image frame at previous time t−1, moving the particles in the parameter space. As a result, a plurality of candidate curves in the image frame at time t are determined. In more detail, the sampling portion 29 includes a variation acquisition unit 46 and a particle operation unit 48.

The variation acquisition unit 46 acquires an image frame and depth image data from the image storage section 24, thus acquiring information about the motion of the tracked target picture on the image plane and information about the motion of the tracked target in the depth direction. The particle operation unit 48 determines the destination of each particle in the parameter space on the basis of the motion information acquired by the variation acquisition unit 46 after generation or extinction of particles.

More specifically, the particle operation unit 48 determines the translational components of the shape space vector on the basis of motion information on the image plane and the magnification factor components on the basis of motion information in the depth direction. Other components may be determined by a common technique such as Gaussian distribution. The sampling portion 29 starts tracking when requested by the tracking start/end determination section 28 and ends tracking also when requested by the tracking start/end determination section 28.

The observation portion 30 observes the likelihood of the candidate curve determined by each of the particles that have been moved by the sampling portion 29. For example, if the candidate curve determined by each of the particles is represented by a B spline curve, the observation portion 30 finds the outline closest to each knot of the B spline curve in the outline image generated by the outline image generation section 22 and finds the distance thereof, thus scoring the knots by a given rule. Then, the likelihood of a candidate curve is found on the basis of the scores of all the knots making up the candidate curve.

The result acquisition portion 34 calculates the probability density distribution $p(x_t^i)$ as shown in Formula 3 on the basis of the likelihood observed by the observation portion 30, thus calculating tracking results such as curve data acquired by the parameter weighted and averaged by the above distribution and storing the tracking results in the result storage section 36. Further, the result acquisition portion 34 returns that data to the sampling portion 29 for use in tracking at next time t+1. Data stored in the result storage section 36 may be any of the values of weighted and averaged parameters, an image made up of only the curves that are determined by these parameter values, and image data obtained by combining curves and input image.

If there are a plurality of tracked targets, the result acquisition portion 34 may further generate a result for each tracked target using a template prepared for each tracked target and combine these results for use as tracking results. Alternatively, the result acquisition portion 34 detects, from tracking results, a case in which a plurality of tracked targets are arranged one behind another and takes a necessary measure such as excluding the tracked target hiding behind other from the set of tracked targets at a given time. This makes it possible to avoid inadequate tracking results from being output even despite a temporary decline in observed likelihood as a result of a tracked target hiding behind another target.

Subjecting each image frame to the above processes handled by the outline image generation section 22 and the tracking section 26 ensures that movie data including, for example, tracking results is stored in the result storage section 36. In this case, the movie data is output to the display device 16 under control of the output control section 40, thus showing a template curve that moves in the same manner as the tracked target. It should be noted that the output control section 40 may output tracking results to a separate arithmetic module in addition to showing tracking results as a movie as described above.

A description will be given next of the operation of the tracking device 10 configured as described above. A case will be described below in which a person at a certain location is tracked as an example. At this time, the imaging device 12 shoots the space of the shot target at a given frame rate. As a result, acquired image data is supplied to the image acquisition section 20 of the tracking device 10 and stored in the image storage section 24 one after another. Tracking which will be described below is performed in this condition.

Figure 5:
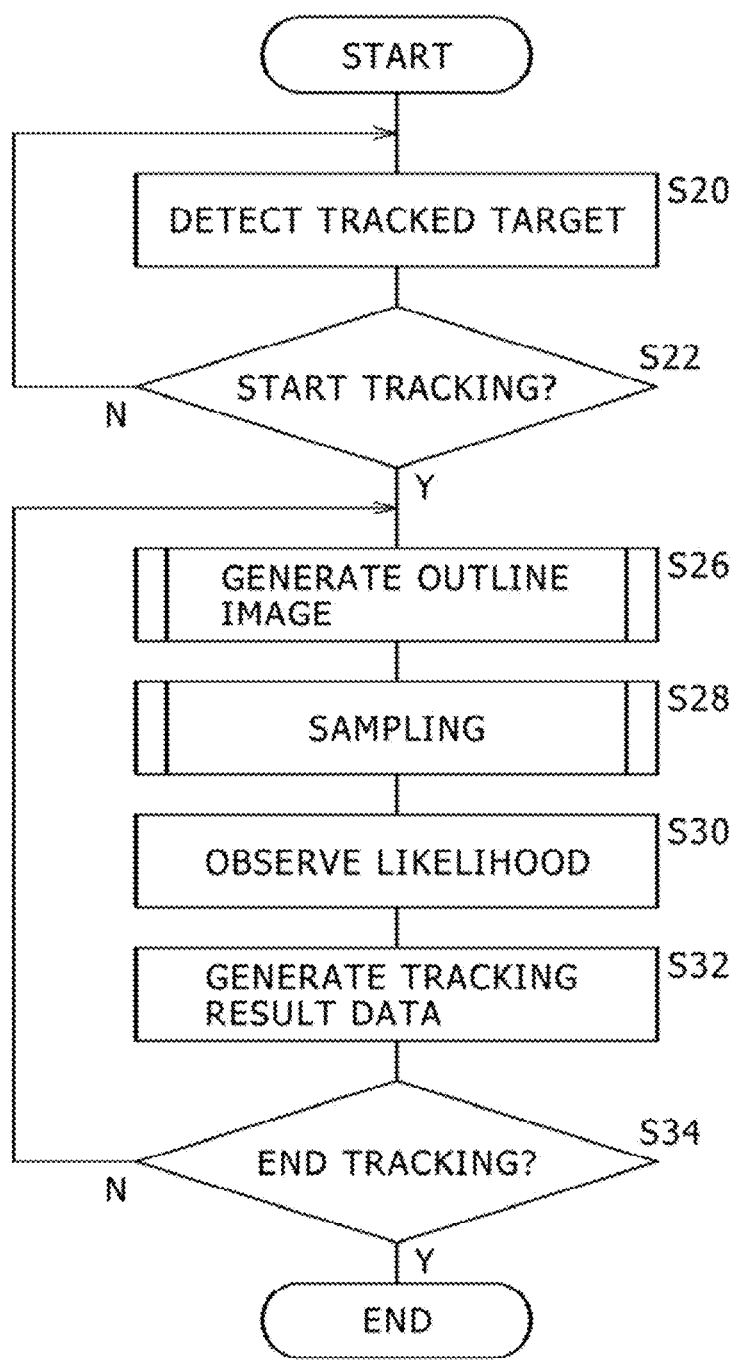
FIG. 5 is a flowchart illustrating a tracking procedure in the present embodiment.

FIG. 5 is a flowchart illustrating a tracking procedure in the present embodiment. In this example, a person is tracked. Therefore, an ohm-shaped template is prepared in the tracking device 10 as described earlier. It should be noted that the template representation method is not limited to B spline curve and that any description format is acceptable so long as it can represent a desired curve. Further, a template shape modification method may be selected as appropriate which is suitable for the description format and allows for flexible modification as described above by changing several parameters.

First, the tracking start/end determination section 28 reads shot image data from the image storage section 24 frame by frame and determines, by monitoring a tracked target, whether to start tracking (S20 and S22). For example, if a target having a given size and shape that are likely to be a person emerges as a foreground extracted from an image frame, the tracking start/end determination section 28 determines that tracking will be started. The foreground size and shape for use as determination criteria are determined logically or experimentally in advance. A foreground extractor (not shown) installed in the outline image generation section 22 may be used for extraction of a foreground. In this case, the tracking start/end determination section 28 requests the outline image generation section 22 to proceed with the foreground extraction. Alternatively, a foreground extractor may be installed in the tracking start/end determination section 28.

The tracking start/end determination section 28 continues with monitoring in S20 until it is determined that tracking will be started (N in S22). When it is so determined (Y in S22), the tracking section 26 starts tracking. Here, we assume that the time associated with the image frame whose tracking has been initiated is denoted by t=0, and that the subsequent image frames are associated respectively with t=1, 2, 3, and so on. First, the sampling portion 29 requests the outline image generation section 22 to start generating an outline image, thus causing the outline image generation section 22 to generate an image frame at t=0 (S26). An outline image at this stage may be a common edge image.

The sampling portion 29 performs sampling, for example, by evenly arranging the particles in a given area of the parameter space. The observation portion 30 observes the likelihood through matching between the candidate curve determined by each particle and the outline image. The result acquisition portion 34 calculates the initial value $p(x_0^i)$ of the probability density distribution by using Formula 3 (S28, S30, and S32).

On the other hand, the outline image generation section 22 reads the image frame at time t=1 from the image storage section 24, thus generating an outline image (N in S34 and S26). At this time, edges are extracted after limiting the area using the depth image on the basis of the outline of the tracked target acquired from the initial value $p(x_0^i)$ of the probability density distribution calculated for time t=0. The sampling portion 29 generates as many particles as appropriate to the initial value $p(x_0^i)$ of the probability density distribution in the parameter space and moves these particles for sampling (S28). The number of particles to be generated is controlled in consideration of processing load on the basis of the number of arithmetic resources available with the tracking device 10 and the necessary speed at which to produce results and the like.

Further, as described earlier, the motions of the tracked targets are roughly estimated from a different viewpoint, and the estimation results are reflected in the movement directions of the particles, thus ensuring efficient sampling appropriate to the motion of each of the tracked targets. The observation portion 30 observes the likelihood $p(y_t|x_t^i)$ of each of the candidate curves determined by the particles after the movements (S30). The likelihood is observed for each of the tracked targets using the outline image at time t=1 generated by the outline image generation section 22.

Next, the result acquisition portion 34 finds the probability density distribution $p(x_1^i)$ at time t=1 on the basis of the observed likelihood. If there are a plurality of tracked targets, the above processes are performed on all the tracked targets. Then, the result acquisition portion 34 determines, for example, the ohm-shaped curve acquired by weighting each parameter and taking the average of the parameters using the probability density distribution $p(x_1^i)$ at time t=1 and generates desired tracking result data, for example, by drawing the curve over the original image frame, storing the tracking results in the result storage section 36 (S32).

In parallel with these processes, the tracking start/end determination section 28 determines whether to continue with or end tracking (S34). When it is determined that tracking will not be ended (N in S34), an outline image is generated from the image frame at time t=2, and particles are generated and moved using a probability density distribution $p(x_1^i)$, acquired in S32, at time t=1, thus observing the likelihood of the image frame at time t=2 and calculating the probability density distribution (S26 to S32).

From here onwards until the tracking start/end determination section 28 determines that tracking will be ended (Y in S34), the processes from S26 to S32 are repeated on each of the image frames. As a result, movie data is stored in the result storage section 36. This data presents an ohm-shaped curve that moves in the same manner and has the same shape as the head of the tracked target and changes with time. The output control section 40 outputs this data to the display device 16 and a module adapted to provide other function, thus allowing tracking results to be used in an arbitrary manner.

A description will be given next of the generation of an outline image by the outline image generation section 22. As described earlier, an outline image is used to find the likelihood of each candidate curve and significantly affects tracking results. On the other hand, a shot image includes pictures of a variety of objects in the field of view of the imaging device 12. Therefore, when an edge image and a candidate curve are simply compared, it is probable that accurate observation result may not be obtained due to matching with an edge line representing an object other than the tracked target. A possible solution to remove at least background information would be to process a difference image which represents the difference from a background image prepared in advance. However, if the background itself such as curtain moves, or if the imaging device 12 is moved, it is difficult to extract only the foreground. The higher the necessary foreground extraction accuracy, the higher the precision with which the background image is acquired, thus resulting in more expense in time and effort.

For this reason, in the present embodiment, edges are extracted that are highly likely to be caused by a tracked target using a depth image. FIG. 6 is a diagram for describing the principle of extracting an edge for a tracked target using a depth image in the present embodiment. As illustrated in FIG. 6, we assume that two persons, persons 164 and 166, are shown in an image frame 160 at a certain time. The person 166 is farther away from the imaging device 12 than the person 164. As a result, the picture of the person 166 is smaller than that of the person 164.

A depth image 162 for the image frame 160 represents, as a pixel value, the distance of each of pictures 168 and 170 of the persons 164 and 166, respectively, from the imaging device 12. Although the closer an object is to the imaging device 12, the brighter it is in the depth image 162 in FIG. 6, this does not purport to limit the format of a depth image thereto. Further, the pixel value may actually vary depending on the projections and depressions of the surface of each of the persons. However, it is not necessary for a depth image used in the present embodiment to have an extremely high resolution. Further, if there is an object other than the persons 164 and 166 in the field of view of the imaging device 12, the depth image naturally includes a picture of that object.

The edge extraction portion 44 of the outline image generation section 22 extracts the appropriate picture area in the depth image 162 on the basis of the tracking results for the image frame at the previous time. For example, the edge extraction portion 44 refers to the depth image 162 at the current time on the basis of the outline of the head of the person 164 estimated in the previous image frame, thus identifying a distance Zt of the person 164 from the imaging device 12. At this time, a face recognition result may be used rather than the outline of the head. Then, the edge extraction portion 44 extracts the pixels having values that fall within a distance range $Zt-\Delta Z < z \leq Zt+\Delta Z$ determined in consideration of the projections and depressions of the surface, the body thickness, the distance calculation error and the like on the basis of the distance Zt. At this time, the edge extraction portion 44 extracts the pixels only from a processing area 172 determined on the basis of the tracking results of the previous image frame, thus ensuring reduced chance of extraction of pictures of other objects at similar distances.

As a result, the area of the picture 168 of the person 164, i.e., the outlined area in FIG. 6, can be identified. The area of the picture 170 of the person 166 can also be identified by the same processes if the person 166 is a tracked target. Using such picture information and information obtained from an edge image acquired separately makes it possible to acquire edge lines of only a tracked target with minimal impact caused by the motions of other objects such as background and the motion of the imaging device 12 itself.

Figure 7:
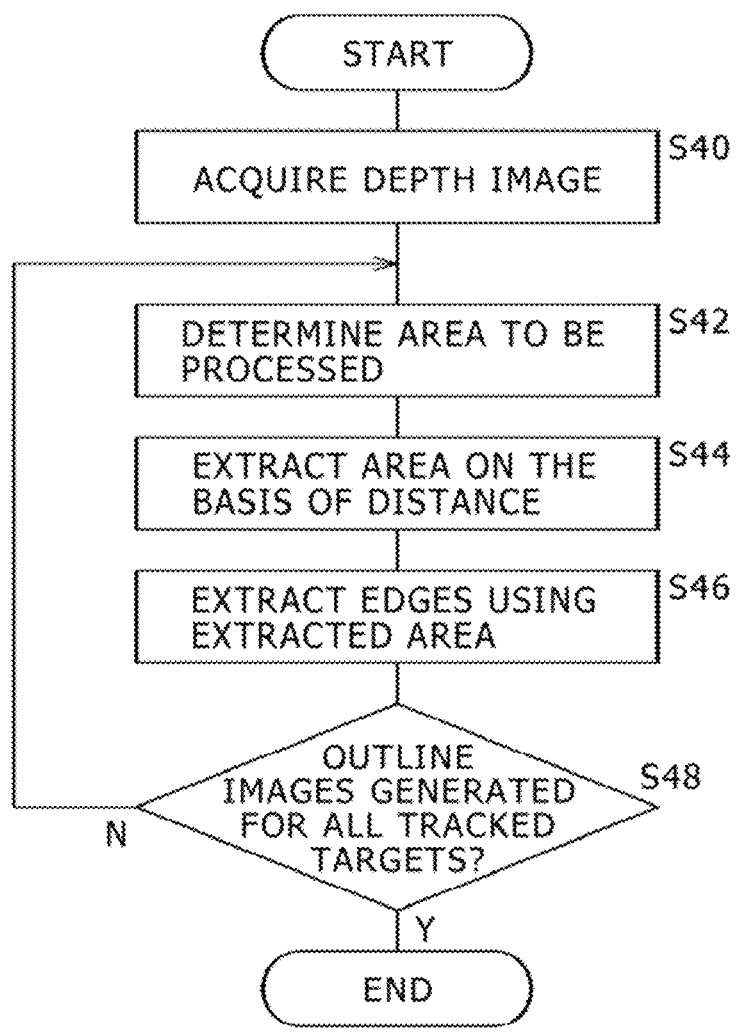
FIG. 7 is a flowchart illustrating a procedure for an outline image generation section to generate an outline image in the present embodiment.

FIG. 7 is a flowchart illustrating a procedure for the outline image generation section 22 to generate an outline image in S26 of FIG. 5. First, the depth image acquisition portion 42 acquires the depth image of the image frame at time t by any of the above processes (S40). Next, the edge extraction portion 44 acquires the tracking results at previous time t−1 from the tracking section 26, thus determining the processing area on the image plane (S42).

For example, a processing area is obtained by first generating, on the image plane, a rectangular area inside the estimated outline of the head or a rectangular area of the head area circumscribed to the outline. Then, another rectangular area each of whose sides is at a given vertical or horizontal distance from the corresponding side of the above rectangular area is used as a processing area. This contributes to improved extraction efficiency and eliminates the impact of other objects to the extent possible. The size of the processing area is determined on the basis of the movable range of the head from the previous time. The apparent movable range varies depending on the distance from the imaging device. Therefore, the size of the processing area is varied in accordance with the distance of the tracked target obtained from the depth image.

Next, the edge extraction portion 44 extracts, on the basis of the pixel value, the picture area of the tracked target appearing within the processing area in the depth image at time t (S44). For example, the head outline estimated in the image frame at previous time t−1 is fitted to the depth image, after which the average or center pixel value inside the outline is determined as the distance Zt of the tracked target. Then, the pixels are extracted which have values that fall within the range $Zt-\Delta Z < z \leq Zt+\Delta Z$ as described above. When a human body is a tracked target, $\Delta Z$ is typically 30 cm or so. However, the farther away from the imaging device 12, the larger the distance calculation error. Therefore, $\Delta Z$ is preferably adjusted in accordance with the distance.

Next, the edge extraction portion 44 generates an edge image from the image frame at time t first and then extracts edges that are likely to have been caused by the tracked target using the area extracted in S44 (S46). Most simply, the edge extraction portion 44 extracts the edge line of the area extracted in S44. It should be noted, however, that, in this case, an area is generated which is obtained by expanding the area extracted in S44 to an extremely small extent by a given magnification factor, and the edges are extracted from within this area. This ensures that the outline does not overlap or lie off the border line of the extracted area so as to prevent the critical edges representing the outline from being detached from the extraction target.

Alternatively, the tracked target area may be found from a different viewpoint and combined with the area extracted from the depth image as described above. For example, the foreground area of a shot image may be extracted by the background difference method, and the foreground area of the processing area determined in S42 is identified separately as a tracked target. Then, edges are extracted from at least one of the two areas, one obtained by expanding the foreground area extracted in S44 to an extremely small extent for the same reason as described above and another extracted in S44. This ensures minimal loss of extracted edges even in the event of a missing area in the picture area of the tracked target that has been extracted from the depth image due, for example, to difficulty involved in calculating the distance. Further, the processing area is limited, thus preventing an excessively large foreground area from being extracted even in the event of movement of the background.

Further, the edge extraction portion 44 may stably acquire edges representing the outline of the tracked target while at the same time removing edges representing wrinkles of clothing by giving a new twist to how to generate an edge image, the source of edges. For example, the number of gray levels of a shot image frame may be reduced first before edge extraction as described in Japanese Patent Laid-Open No. 2009-224924.

As has been described above, an edge refers to a line segment representing a portion that undergoes a large change in illuminance or color. Basically, therefore, a certain threshold is specified for the extent of change in illuminance with respect to the image plane. The portions having a change beyond the threshold are extracted as edges. As a result, the edge extraction result is significantly affected by the threshold setting. However, the luminance distribution varies depending on the colors of the objects present, the manner in which shades are created, illuminance, and so on. If the set threshold is not appropriate for the change in these environmental factors, it is probable that normal edges may not be extracted as edges, and that even fine wrinkles of clothing may be extracted.

For this reason, the number of gray levels of the original image frame is reduced to give priority to broad information about the object's surface as a whole rather than detailed information about the surface thereof, thus making it easier to extract the object's outline as edges. That is, the area representing the object's surface is contained within the same gray levels as much as possible irrespective of shades and wrinkles, thus causing the gray levels to vary significantly with the object's outline. This restricts the location where the filtering parameters such as derivative of luminance stand out, thus making it possible to stably acquire edges representing the outline without optimizing the threshold in a detailed manner.

At this time, the image frame is smoothed with a common smoothing filter such as Gaussian filter, Median filter, simple averaging filter, and low-pass filter, thus removing high-frequency components and making it easier to grasp the object's surface as an area. Then, the luminance values are divided at the predetermined border. Then, the luminance values within each division are converted into a single luminance value, thus reducing the number of gray levels. At this time, the luminance values may be divided evenly from the bottom. Alternatively, a color histogram of the image frame may be prepared, and luminance values are specified, at the time of division, which provide equal numbers of pixels. A common posterization method may be used. A low grayscale image may have, for example, 8 gray levels to 32 gray levels.

Then, the low grayscale image is filtered with a common edge extraction filter such as Laplacian filter, Sobel filter, or Canny edge filter, thus generating an edge image. Of the edges thus acquired, only those of the area extracted by using a depth image as described above or those of an area obtained by adding the extracted area and the foreground area together are further extracted, thus providing more reliable edges as an outline of the tracked target.

If there is another tracked target (N in S48), the processes in S42, S44, and S46 are repeated. When an outline image is generated for each of all the tracked targets, the processes are terminated (Y in S48). As a result, an outline image is generated for each of the tracked targets. The observation portion 30 of the tracking section 26 compares the candidate curve generated for each of the tracked targets against the outline image read from the image storage section 24 and associated with that tracked target, thus observing the likelihood.

Figure 8:
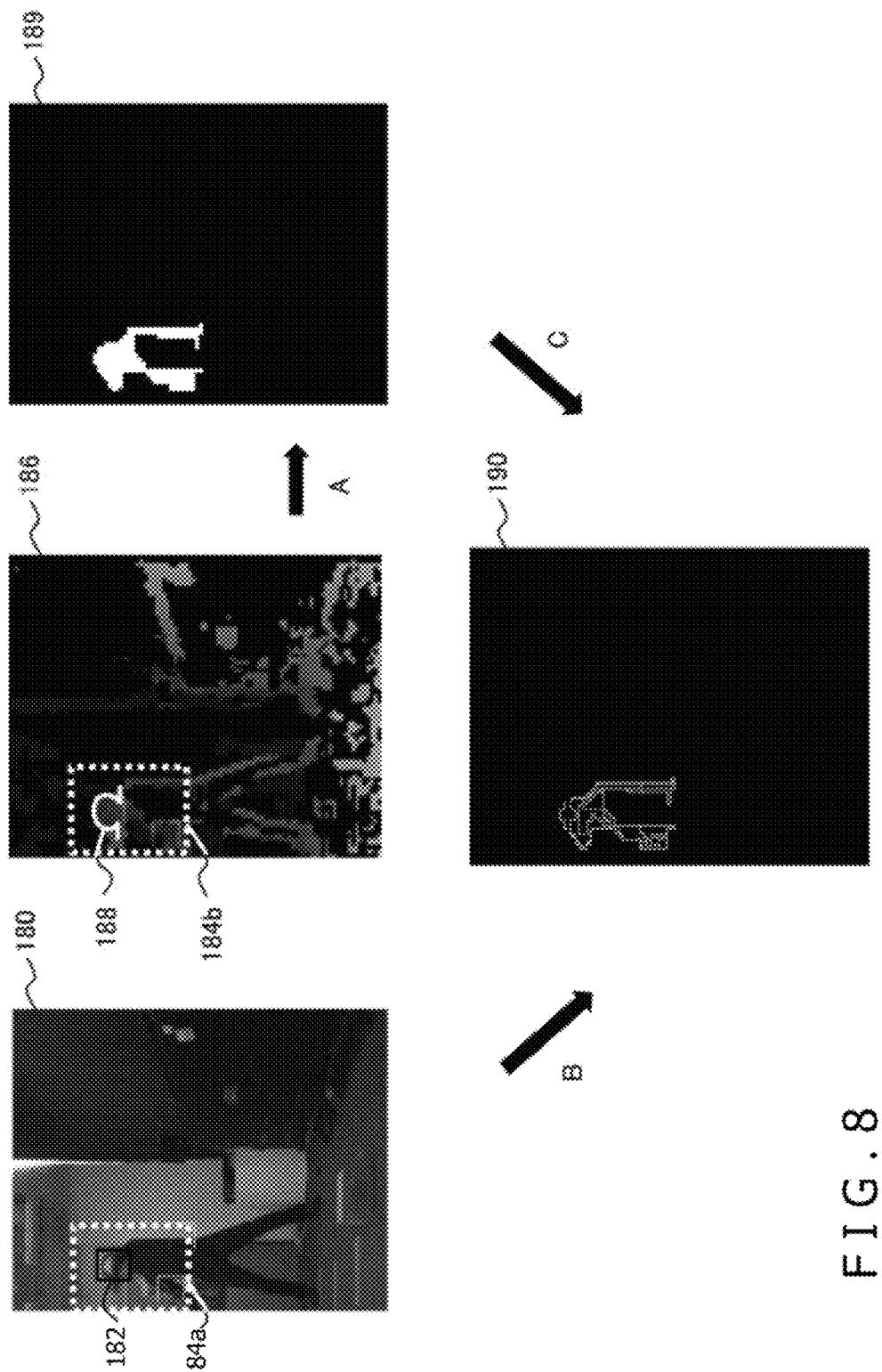
FIG. 8 is a diagram illustrating a manner in which an outline image is generated using a real-life image in the present embodiment.

FIG. 8 illustrates a manner in which an outline image is generated using a real-life image. First, a processing area 184a is set, by a given rule, within a head area 182 acquired from the tracking results of the previous image frame on the image plane of an image frame 180. On the other hand, a head outline 188 estimated in the previous image frame is fitted to a depth image 186 associated with the image frame 180, determining the range of values of the pixels to be extracted as a picture area of that tracked target on the basis of the pixel values of the inside area.

The pixels having values that fall within the determined range are extracted from a processing area 184b of the depth image 186, thus generating an image 189 that represents the picture area of the tracked target (arrow A). Of the edges in the edge image generated from the image frame 180, those edges for the area representing the image 189 or those for the area obtained by adding the extracted area and the foreground area are extracted, thus providing an outline image 190 of the tracked target (arrows B and C). As described earlier, the original edge image is obtained by reducing the number of gray levels of the image frame 180 followed by edge extraction.

A description will be given next of the movement of particles in the parameter space by the sampling portion 29 of the tracking section 26. As described with reference to FIG. 2, the sampling portion 29 moves the particles, generated or extinguished to suit the probability density distribution estimated in the previous image frame, to suit the image frame at the current time. In general, the particles are Gaussian-distributed in the parameter space, or a kinetic model is estimated through self-regression prediction as described earlier.

Depending on the will of the person, i.e., the tracked target, and the type of information processing that takes advantage of the tracking results such as games, the characteristics of motion are varied, making it difficult to set a kinetic model which can cope with all kinds of information processing. The larger the discrepancy between the set kinetic model and the actual motion, the lower the accuracy with which the candidate outline is arranged, resulting, by extension, in degraded tracking accuracy. Increasing the number of particles to maintain the tracking accuracy leads to increased processing load, making it more likely for real-time properties to be lost. In the present embodiment, for this reason, the variation acquisition unit 46 acquires the motion of the tracked target picture and the motion in the depth direction separately, thus moving the particles efficiently and accurately in response to the actual motion.

Figure 9:
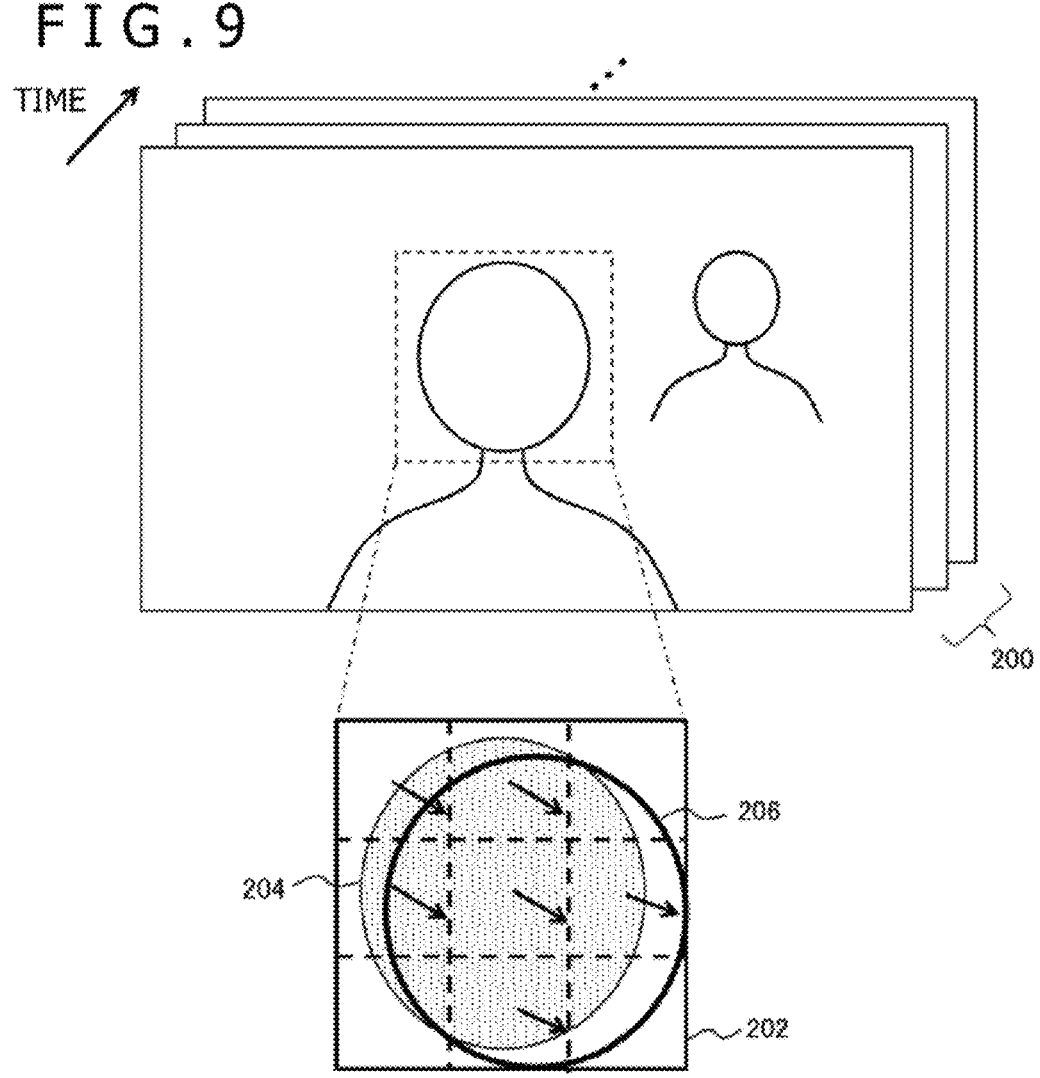
FIG. 9 is a diagram for describing the principle of determining horizontal (x-axis) and vertical (y-axis) translational components of a shape space vector in the present embodiment.

FIG. 9 is a diagram for describing the principle of determining horizontal (x-axis) and vertical (y-axis) translational components of the shape space vector. As with FIG. 6, each of image frames 200 includes a plurality of pictures of persons. As illustrated in FIG. 9, the image frames 200 are acquired one at a time at a given rate with respect to the time axis. Of these, the pictures of the head of a person in the image frames 200 at times t−1 and t are expanded and overlaid one on top of the other, thus showing a head area 202. We assume here that the shaded area enclosed by a fine line is a head picture 204 at time t−1, and that the outlined area enclosed by a bold line is a head picture 206 at time t. This example shows that the head picture moves to the right and down in the image as time elapses from time t−1 to time t.

Acquiring this motion through matching between the image frames reveals in which direction of the image plane and by how much the particles, generated on the basis of the probability density distribution at time t−1, should be moved for efficient sampling for time t. It should be noted, however, that the head does not typically move in parallel with its outline shape maintained unchanged because, for example, of rotation of the head itself. Therefore, the image of the head area 202 is divided into a plurality of image blocks, and the destination of the picture is determined for each image block. Then, the motion vector of the head as a whole is found from these motion vectors. The motion vector of the head as a whole is obtained, for example, by averaging the motion vectors of the image blocks or finding the center value thereof.

In the example shown in FIG. 9, the head area 202 is divided into nine image block in total, three vertically and three horizontally, with the motion vectors of these image blocks shown by arrows. It should be noted that the head area 202 probably includes pictures of objects other than that of the head such as background. The more these pictures are included in calculations, the larger the error associated with the head motion vectors. It is, therefore, desirable to exclude the image blocks from motion vector calculations depending on the types of pictures included in that image block. It is possible to detect, from the pixel values of the areas of the depth image associated with the respective image blocks, the extent to which pictures other than that of the head are included in the image blocks.

For example, the average or center pixel value of the image blocks in the depth image at the previous time is compared against the average pixel value inside the head outline estimated at that time. When the difference therebetween is equal to a given value or greater, it is determined that many pictures other than the head are included in that image block. As a result, that image block is excluded from being subject to matching. In the example shown in FIG. 9, of the three by three image blocks of the head area 202, the right top and left bottom image blocks do not have an arrow which means that these blocks have been excluded from being subject to matching.

When the variation acquisition unit 46 calculates motion vectors (Mx, My) of the head as a whole in this manner, the particle operation unit 48 moves the particles, generated from the tracking results at time t−1, on the image plane in such a manner as to suit the motion vectors (Mx, My). That is, of the shape space vector x represented by (Formula 1), translational components (shift$_x$(t), shift$_y$(t)) at time t are specified as follows:

$$shift_x(t)=shift_x(t-1)+\alpha Mx$$

$$shift_y(t)=shift_y(t-1)+\alpha My$$

Here, (shift$_x$(t−1), shift$_y$(t−1)) are the translational components of the respective particles before movement, and α is the adjustment term and may be a random number that obeys a given distribution curve. This makes it possible to arrange the particles efficiently in consideration of the approximate motion of the head estimated by matching. It should be noted that "matching" of each image block may be performed not only by block matching that makes searches on an area-by-area basis but also by searching for feature point destinations.

For example, the kanade-lucas-tomasi (KLT) tracking technique, a kind of optical flow, may be used. The KLT tracker selects a microscopic area with small ambiguity and detects a microscopic area that is most analogous to the microscopic area in question in the succeeding image frame. This technique allows for accurate tracking even when the tracked target is not moving.

This contributes to reduced likelihood of misperception that occurs one to perceive as if the head is moving when other object such as arm moves in front of the head. However, this does not purport to limit the matching technique to the above. Instead, any of the common techniques may be used including color histogram. It should be noted that it is desirable to ensure efficiency in processing by using images with a plurality of resolutions particularly if destinations are searched for with focus on feature points as when KLT is used. That is, images with a plurality of resolutions are generated by downsizing the shot image, the original image, for each of the image frames. Then, feature points corresponding to those of the previous image frame are searched for from the low resolution side.

Here, when an image at a certain resolution is searched for, the search range is restricted on the basis of the positions of the feature points detected in the image at one lower resolution. The resolution of the search target is increased in this manner. When it can be considered that there is a match between the detected feature point positions at a plurality of resolutions, it is determined that the search results have converged. As a result, no further searches are made in the images at higher resolutions. This provides a significantly narrower search range than searching broad areas at high resolutions, thus ensuring higher efficiency. Image data with a plurality of resolutions generated by the imaging device 12 as described above may be acquired successively. Alternatively, such data may be generated by the variation acquisition unit 46 from each of the image frames.

Further, in addition to identifying and excluding, from being subject to matching, the image blocks that include a number of pictures other than that of the head using a depth image as described above, those motion vectors that are considered abnormal of all the motion vectors of the image blocks may be excluded from the determination of the motion vectors for the head as a whole. The image frames are acquired every 1/30 of a second or less, and the distance over which the head can move within such a short amount of time is limited. Therefore, an upper limit Vu of the motion vector length is specified in accordance with the movable distance of the tracked target such as head. The motion vectors longer than this upper limit are excluded from the determination of the motion vectors for the head as a whole.

Here, the motion vectors are apparent ones on the shot image. Even if the tracked target actually travels the same distance, the closer it is to the imaging device, the longer the motion vector. Therefore, the distance z of the tracked target from the imaging device is acquired by referring to the depth image. The length upper limit Vu is specified as follows in accordance with the distance z:

$$Vu=C \times Zo/z$$

where Zo is the reference distance, and C the apparent upper limit of the movable distance when the tracked target is present at that distance, and may be derived logically from the angle of view of the imaging device 12 or determined experimentally.

Figure 10:
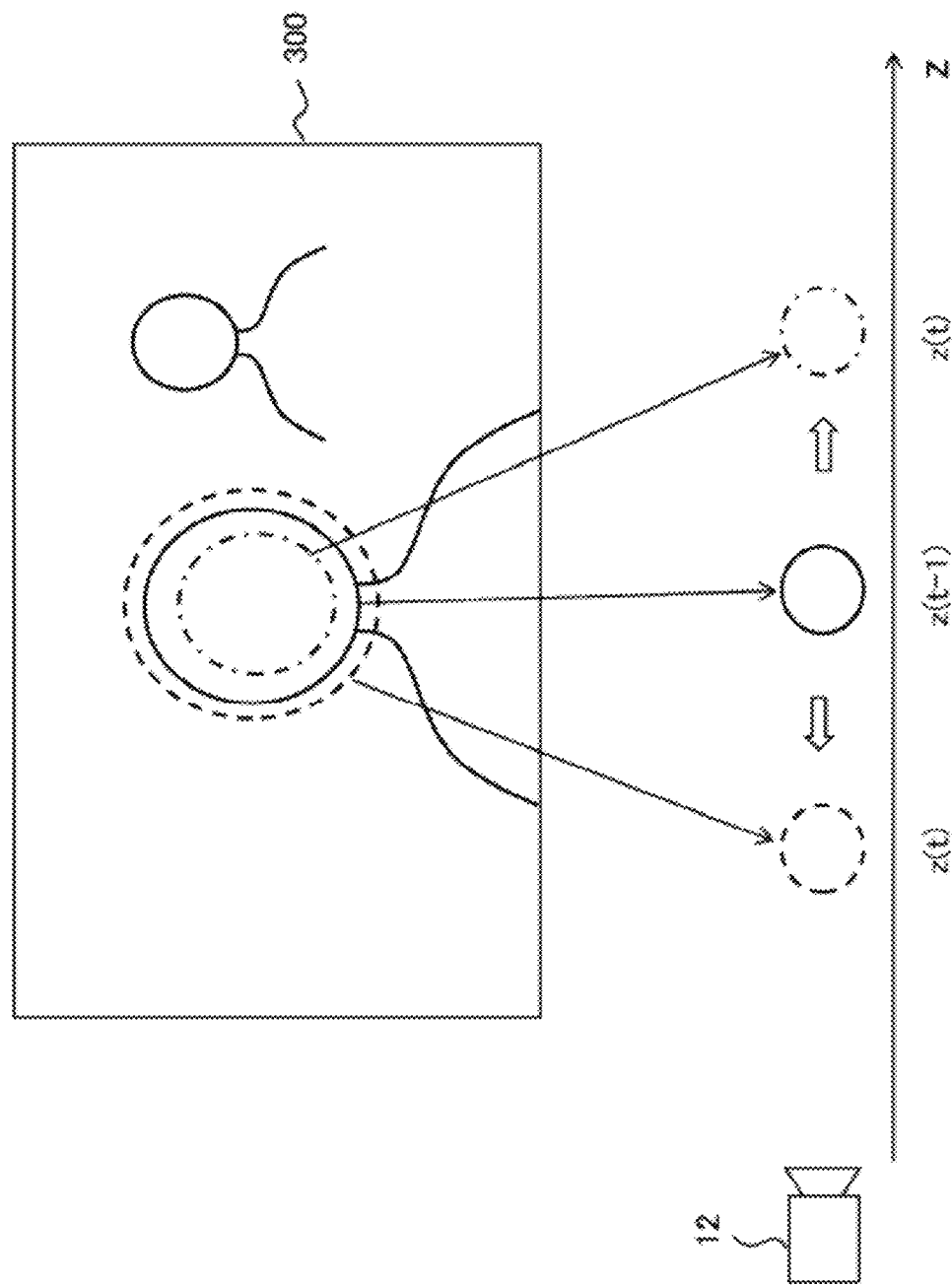
FIG. 10 is a diagram for describing the principle of determining horizontal (x-axis) and vertical (y-axis) magnification factor components of the shape space vector in the present embodiment.

The sampling portion 29 further determines the magnification factor components of the shape space vector using information about the distance from the imaging device 12. FIG. 10 is a diagram for describing the principle of determining the horizontal (x-axis) and vertical (y-axis) magnification factor components of the shape space vector. In FIG. 10, solid lines represent the pictures of persons in an image frame 300 at time t−1. In contrast, at present time t, if the outline of the head of the person on the front becomes smaller as shown by a long dashed short dashed line, this means that the head is moving away from the imaging device 12. On the other hand, if the outline becomes larger as shown by a dotted line, this means that the head is moving closer to the imaging device 12.

The relationship between the head position from the imaging device 12 and the head picture is schematically shown at the bottom of FIG. 10 with the distance z along the horizontal axis. That is, if a distance z(t) at time t is greater than a distance z(t−1) at time t−1, the picture thereof is becoming smaller. On the other hand, if the distance z(t) at time t is smaller than the distance z(t−1) at time t−1, the picture thereof is becoming larger. The variation acquisition unit 46 acquires z(t−1) and z(t) from the pixel values of the tracked target in the depth images at times t−1 and t. Here, the picture of the tracked target at time t can be roughly estimated by the technique shown in FIG. 9.

Then, the particle operation unit 48 determines the magnification factor components of the shape space vector using the acquired distance information. For example, of the shape space vector x represented by (Formula 1), magnification factor components (extend$_x$ (t), extend$_y$ (t)) at time t are specified as follows:

$$extend_x(t) = extend_x(t-1) \times \beta f(\Delta z)$$

$$extend_y(t) = extend_y(t-1) \times \beta f(\Delta z)$$

Here, (extend$_x$(t−1), extend$_y$(t−1)) are the magnification factor components of the respective particles before movement. f(Δz) is the function for deriving, as a finite range, the rate of change of the head size determined by the variation Δz=z(t)−z(t−1) in distance from the imaging device 12 in consideration of the distance calculation error. Qualitatively, a numerical range greater than 1 and that smaller than 1 are output as the function f(Δz) respectively when the tracked target moves closer to and away from the imaging device 12. For example, when the tracked target moves closer to the imaging device 12 by 0.5 m, f(−0.5)=1.5 to 2.0. On the other hand, when the tracked target moves away from the imaging device 12 by 0.2 m, f(0.2)=0.7 to 0.8. The function f(Δz) may be a logical calculation formula based on the angle of view of the imaging device 12 or be represented as a conversion table. β is the adjustment term and may be a random number that obeys a given distribution curve.

Although only the most recent travel, i.e., the difference between the distances z(t−1) and z(t), was considered in the description given above, a travel from another time may be further considered to more precisely determine the magnification factor components. For example, the distance z(0) of the tracked target at the time of starting tracking is used. Then, the ranges of the magnification factor components determined from the variation Δzo=z(t)−z(0) during that period, i.e., the ranges which are a set of products between $$extend_x(t)' = extend_x(0) \times \beta f(\Delta zo)$$

$$extend_y(t)' = extend_y(0) \times \beta f(\Delta zo)$$

and the magnification factor components extend$_x$ (t) and extend$_y$ (t) that can be determined from the above most recent variation Δz are derived for the x and y directions and used as the final ranges of the magnification factor components.

This prevents excessive changes in the magnification factor components attributable to the presence of areas whose distances from the imaging device are difficult to obtain. Further, even if the head size seems to have changed sharply because of an object other than the head such as arm in front of the head, sampling of such a size is minimized, thus allowing for correct tracking of the realistic change in head size resulting from movement.

Figure 11:
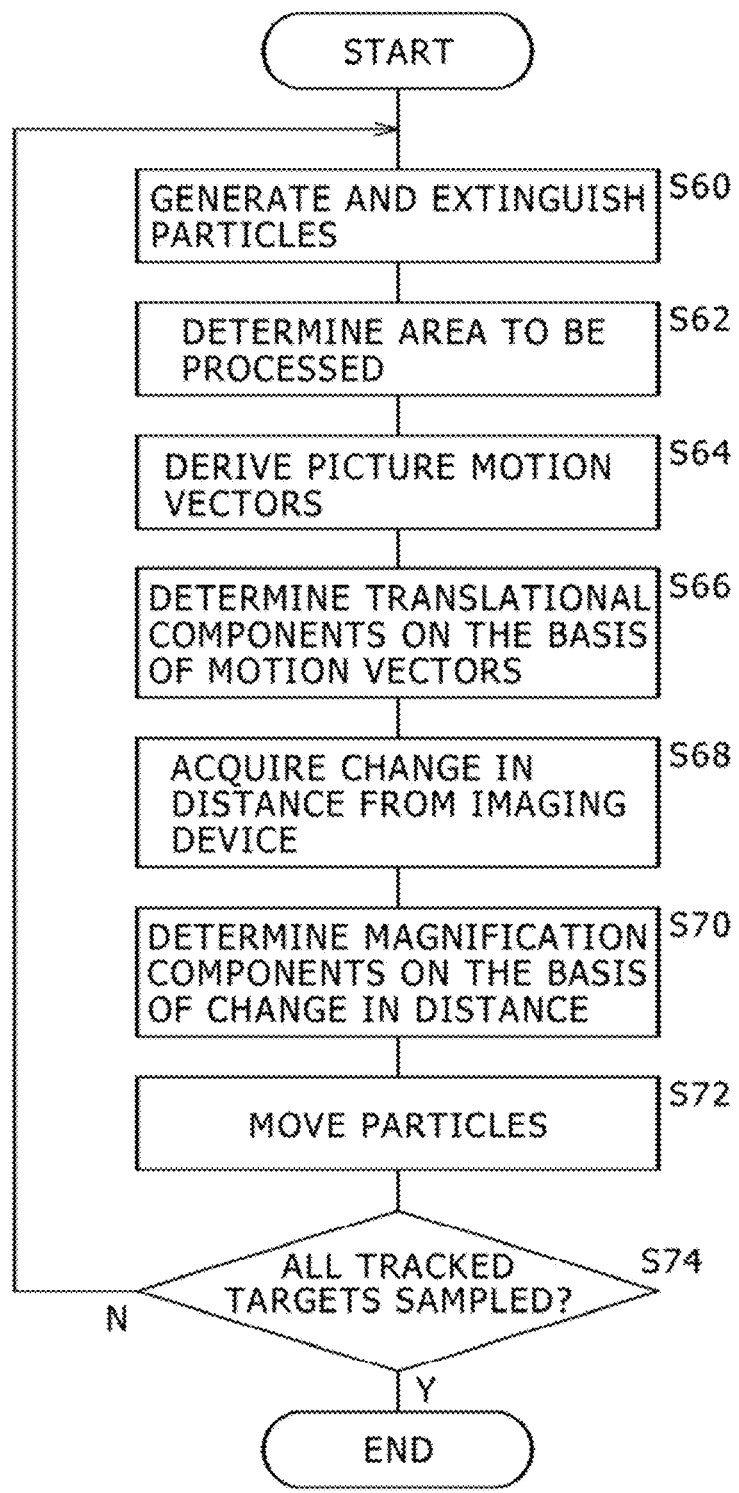
FIG. 11 is a flowchart illustrating a procedure for a sampling portion to sample an outline by arranging particles.

FIG. 11 is a flowchart illustrating a procedure for the sampling portion 29 of the tracking section 26 to sample an outline by arranging particles in S28 of FIG. 5. First, the particle operation unit 48 generates or extinguishes particles in the parameter space to suit the probability density distribution p($x_{t-1}^i$) at previous time t−1 (S60). In parallel therewith, the variation acquisition unit 46 sets a processing area in the image frame on the basis of the head outline represented by the probability density distribution (S62). Here, the term "processing area" refers to an area subject to matching with the image frame at next time t such as the head area 202 shown in FIG. 9. This area is, for example, a rectangular area circumscribed to the outline or a rectangular area obtained by enlarging the original rectangular area by a given magnification factor.

Next, the variation acquisition unit 46 derives a motion vector of the head picture between the image frames at time t−1 and t (S64). A motion vector is found by acquiring a motion vector for each of the image blocks of the processing area, for example, through matching between frames and averaging the motion vectors across the processing area or calculating the center value. At this time, those image blocks including a number of pictures other than the head are excluded from being subject to matching, or the motion vectors longer than the upper limit are excluded from calculations, accurately estimating the motion of the head picture.

The particle operation unit 48 calculates the translational components of each particle using the motion vector (Mx, My) obtained as described above (S66). On the other hand, the variation acquisition unit 46 refers to depth images at a plurality of times, thus finding the most recent variation Δz of the head position in the depth direction and the variation Δzo from a reference time such as processing start time (S68). The particle operation unit 48 finds the ranges of the values that the particles should take on in response to changes over such different spans of time, acquiring the set of products thereof and calculating the magnification factor components of each particle (S70).

Then, the particle operation unit 48 moves the particles in such a manner that the translational and magnification factor components of the shape space vector x have the values or distribution determined in S66 and S70 (S72). If there is other tracked target (N in S74), the processes from S60 to S72 are repeated. When the particles are moved for each of all the tracked targets, the processes are terminated (Y in S74). As a result, candidate outlines of the tracked targets at time t can be generated efficiently at more accurate positions and in more accurate sizes.

The embodiment described above uses depth image information to generate an edge image for likelihood observation in visual tracking using a particle filter. Visual tracking tracks a target such as human head in a movie being shot. A depth image represents the distance from an imaging device on the image plane. More specifically, in the processing area determined on the basis of the tracking results of the previous image frame, those pixels whose distances fall within a given distance from the imaging device are extracted from the depth image as the picture area of the tracked target. Then, edges are extracted from within one of two areas, one obtained by expanding the picture area to a given extent and another which is the sum of the picture area and the area obtained by expanding the separately extracted foreground area to a given extent.

Using a depth image allows for rough identification of the picture area of the tracked target, thus making it possible to eliminate the impact of edge lines attributable to background and other objects during likelihood observation. This makes it possible to find the likelihood of each candidate curve, and by extension, the probability density distribution with high accuracy. Here, by taking the sum of the tracked target area and the foreground area, it is possible to make up for portions whose distance calculation has failed. Further, limiting the processing area on the basis of the tracking results at the previous time ensures minimal adverse impact on the edge extraction result even if a background image used for foreground extraction is not available. As a result, the above advantageous effect can be achieved even if it is difficult to extract the foreground with high accuracy due to motion of the background or for reasons of illumination.

Still further, in the process of moving the particles, the motions thereof from the image frame at the previous time are roughly estimated. That is, the tracked target area, determined on the basis of the tracking results of the previous image frame, is matched between frames, thus acquiring a motion vector of the picture on the image plane. Still further, the change in distance of the tracked target from the imaging device is acquired on the basis of the depth image. The translational components of the shape space vector that defines each particle are determined, and the magnification factor components are determined on the basis of the change in distance from the imaging device.

This makes it possible to determine a kinetic model of the tracked target, the model which has previously been difficult to estimate with accuracy, in accordance with the actual motion, thus allowing for efficient sampling of candidate curves. This ensures highly accurate tracking even when the number of particles is limited. Further, tracking is eventually conducted in a precise manner using particles. Therefore, it is only necessary to roughly estimate the motion by matching or other means so as to keep the processing load small. Even if such an estimation fails, tracking itself does not break down during that period as long as the particles are distributed as usual, thus allowing for highly accurate tracking without increasing the processing load as a whole.

Further, information such as whether the picture is that of the tracked target, the change in realistic movable range, and the change in size, is acquired using a depth image, thus making it possible to exclude abnormal values at any of the stages of the processing. As a result, even if a person is dancing or making a complicated move, it is possible to minimize the impact of the motions of objects other than that of the tracked target.

The present disclosure has been described above according to the embodiment. It will be understood by those skilled in the art that that the above embodiment is illustrative, that the combination of the components and processes can be modified in various ways, and that these modifications also fall within the scope of the present disclosure.

The present disclosure contains subject matter related to that disclosed in Japanese Priority Patent Application JP 2014-211104 filed in the Japan Patent Office on Oct. 15, 2014, the entire content of which is hereby incorporated by reference.

What is claimed is:

1. An image processing method for an image processor to track a first tracked target and a second tracked target in a movie, the first tracked target located at a first z-distance $z1$ and the second tracked target located at a second z-distance $z2$ at least a z-distance $z3$ from $z1$, the image processing method comprising:
   a) calculating a depth image from an image frame making up a movie at time t, the depth image representing, as a pixel value on an image plane, a unique subject distance from an imaging device,
   wherein the depth image is calculated for an entirety of the image frame;
   b) acquiring a first tracking result for the first tracked target and a second tracking result for the second tracked target at time t−1,
   c) determining a first processing area for the first tracked target and a second processing area for the second tracked target,
   wherein the first processing area and the second processing area are determined based on a basis of movable ranges of the first tracked target and the second tracked target, respectively,
   wherein the first z-distance and the second z-distance are used to adjust the movable ranges,
   d) extracting a first picture area for the first tracked target from the image frame at time t by:
      fitting the first tracking result at time t−1 to the depth image:
      calculating an average z-distance $Zt$ for all pixels within an area bounded by the first tracking result; and
      extracting all pixels in the image frame which have values within a range of $Zt-\Delta Z<z1<Zt+\Delta Z$ in the depth image to form the first picture area,
      wherein $\Delta Z<z3$;
   e) extracting a second picture area for the second tracked target from the image frame at time t by:
      fitting the second tracking result at time t−1 to the depth image:
      calculating an average z-distance $Zw$ for all pixels within an area bounded by the second tracking result; and
      extracting all pixels in the image frame which have values within a range of $Zw-\Delta Z<z2<Zw+\Delta Z$ in the depth image to form the second picture area;
   f) generating a third tracking result for the first tracked target at time t using the first picture area;
   g) generating a fourth tracking result for the second tracked target at time t using the second picture area; and
   h) repeating steps a)-g) for an image frame at time t+1 to track the first tracked target and the second tracked target in the movie.

2. The method of claim 1, wherein the wherein step c) further includes extracting a foreground area from the image frame using a background image prepared in advance.

3. The method of claim 1, wherein the image frame is subjected to gray level reduction prior to steps d) and e).

4. An image processing method for an image processor to track a tracked target in a movie, the image processing method comprising:
   a) calculating a depth image from an image frame making up a movie at time t, the depth image representing, as a pixel value on an image plane, a unique subject distance from an imaging device,
   wherein the depth image is calculated for an entirety of the image frame;
   b) acquiring a tracking result for the tracked target at time t−1, c) determining a processing area for the first tracked target,
wherein the processing area is determined based on a movable range of the tracked target,
wherein a z-distance z1 of the tracked target is used to adjust the movable range,
d) extracting a picture area for the tracked target from the image frame at time t by:
   fitting the tracking result at time t−1 to the depth image:
   calculating an average z-distance Zt for all pixels within an area bounded by the tracking result;
   and extracting all pixels in the image frame which have values within a range of $Zt-\Delta Z < z1 < Zt+\Delta Z$ in the depth image to form the picture area;
e) generating a tracking result for time using the picture area;
f) repeating steps a)-e) for an image frame at time t+1 to track the tracked target in the movie.

\* \* \* \* \*